United States Patent
Hata et al.

(10) Patent No.: US 9,555,794 B2
(45) Date of Patent: Jan. 31, 2017

(54) DRIVE CONTROL SYSTEM FOR HYBRID VEHICLE

(71) Applicant: TOYOTA JIDOSHA KABUSHIKI KAISHA, Toyota-shi, Aichi-ken (JP)

(72) Inventors: Kensei Hata, Shizuoka-ken (JP); Yuji Iwase, Mishima (JP); Yosuke Suzuki, Hadano (JP); Akira Murakami, Gotemba (JP); Akiko Nishimine, Toyota (JP); Sohei Murata, Chiryu (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/878,320

(22) Filed: Oct. 8, 2015

(65) Prior Publication Data

US 2016/0101771 A1    Apr. 14, 2016

(30) Foreign Application Priority Data

Oct. 14, 2014 (JP) ................................ 2014-210072

(51) Int. Cl.
*B60W 20/00* (2016.01)
*B60W 10/18* (2012.01)
(Continued)

(52) U.S. Cl.
CPC .............. *B60W 20/00* (2013.01); *B60K 6/365* (2013.01); *B60K 6/445* (2013.01); *B60K 6/48* (2013.01); *B60W 10/08* (2013.01); *B60W 10/115* (2013.01); *B60W 10/18* (2013.01); *B60W 20/40* (2013.01); *B60W 30/1843* (2013.01);
(Continued)

(58) Field of Classification Search
CPC ..... B60W 20/00; B60W 20/40; B60W 10/115; B60W 10/18; B60W 10/08; B60W 30/1843; B60W 2510/107; B60K 6/48; B60K 6/445; B60K 6/365; B60K 2006/381; Y10S 903/91; Y10S 903/93
See application file for complete search history.

(56) References Cited

U.S. PATENT DOCUMENTS 5,788,006 A    8/1998   Yamaguchi
2008/0135314 A1*  6/2008  Motoike ................ B60K 6/445
                                                                180/65.265
(Continued)

FOREIGN PATENT DOCUMENTS

JP    H08-295140 A    11/1996
JP    H09126912 A     5/1997
(Continued)

*Primary Examiner* — Michael J Zanelli
(74) *Attorney, Agent, or Firm* — Andrews Kurth Kenyon LLP (57) ABSTRACT

A drive control system is for a hybrid vehicle. The drive control system includes a power split mechanism, a brake mechanism, a first motor, an output member, a second motor and an electronic control unit. The electronic control unit is configured to obtain a temperature of the power split mechanism based on a first time that is a duration of a motor driven state, allow the motor driven state when the obtained temperature obtained by the electronic control unit is lower than a predetermined upper limit temperature, and inhibit the motor driven state when the obtained temperature is higher than or equal to the upper limit temperature.

10 Claims, 5 Drawing Sheets

(51) Int. Cl.
   *B60W 10/08* (2006.01)
   *B60K 6/365* (2007.10)
   *B60K 6/445* (2007.10)
   *B60K 6/48* (2007.10)
   *B60W 10/115* (2012.01)
   *B60W 30/184* (2012.01)
   *B60K 6/38* (2007.10)

(52) U.S. Cl.
   CPC .. *B60K 2006/381* (2013.01); *B60W 2510/107* (2013.01); *Y10S 903/91* (2013.01); *Y10S 903/93* (2013.01)

(56) References Cited

U.S. PATENT DOCUMENTS

| | | | |
|---|---|---|---|
| 2011/0166727 A1* | 7/2011 | Light | B60K 6/445 701/22 |
| 2011/0230292 A1 | 9/2011 | Komatsu et al. | |
| 2013/0109523 A1 | 5/2013 | Shibata et al. | |
| 2015/0367832 A1* | 12/2015 | Oshiumi | B60K 6/445 701/22 |
| 2016/0101773 A1 | 4/2016 | Hata et al. | |

FOREIGN PATENT DOCUMENTS

| | | |
|---|---|---|
| JP | 2000-175304 * | 12/1998 |
| JP | 2010038225 A | 2/2010 |
| JP | 2013-203386 * | 10/2013 |
| JP | 2016078552 A | 5/2016 |
| WO | 2011/114785 A1 | 9/2011 |
| WO | 2013/051158 A1 | 4/2013 |
| WO | WO2014/091582 A1 * | 6/2014 |

* cited by examiner

DRIVE CONTROL SYSTEM FOR HYBRID VEHICLE

INCORPORATION BY REFERENCE

The disclosure of Japanese Patent Application No. 2014-210072 filed on Oct. 14, 2014 including the specification, drawings and abstract is incorporated herein by reference in its entirety.

BACKGROUND OF THE INVENTION

1. Field of the Invention

The invention relates to a control system for a hybrid vehicle that uses a motor, which is used to control the rotation speed of an engine, as a driving force source that outputs driving force for propelling the hybrid vehicle.

2. Description of Related Art

A so-called two-motor hybrid vehicle is described in Japanese Patent Application Publication No. 8-295140 (JP 8-295140 A). The hybrid vehicle includes a power split mechanism formed of a planetary gear mechanism. Torque output from an engine is input to a carrier of the planetary gear mechanism, and a first motor having a power generating function is coupled to a sun gear of the planetary gear mechanism. A ring gear is an output element of the planetary gear mechanism. The ring gear is coupled to a differential via a counter gear unit that constitutes a speed reduction mechanism. A second motor is coupled to the counter gear unit. Electric motor generated by the first motor is allowed to be supplied to the second motor. In addition, a brake that stops rotation of an input shaft coupled to the carrier is provided. In a state where the carrier is fixed by engaging the brake, the power split mechanism functions as a speed reduction mechanism, and is able to amplify torque output from the first motor and output the amplified torque from the ring gear.

International Application Publication No. 2011/114785 describes a system having a similar configuration to that of the hybrid drive system described in JP 8-295140 A. In the drive system of this type, for example, if a vehicle is towed in a state where an engine is stopped, because a carrier is stopped, there is a possibility that it becomes insufficient to supply lubricating oil to pinion gears, pinion pins, and the like. In the system described in International Application Publication No. 2011/114785, a receiver that receives lubricating oil falling from a liquid pool portion provided above a planetary gear mechanism and then guides the received lubricating oil to the pinion pins is provided.

In the hybrid vehicle described in JP 8-295140 A, when the engine is stopped and rotation of the carrier is stopped by the brake, the power split mechanism serves as a speed reducer. When the first motor is caused to function as a motor in this state, torque of the first motor is amplified and output from the ring gear, so it is possible to propel the hybrid vehicle. In this case, because the carrier does not dip lubricating oil, there arises a situation that it is not possible to sufficiently supply lubricating oil to the pinion gears, the pinion pins, and the like, as described in International Application Publication No. 2011/114785.

The system described in International Application Publication No. 2011/114785 is configured to guide lubricating oil falling from the liquid pool portion provided above the planetary gear mechanism to the pinion pins or the pinion gears. Therefore, when lubricating oil is sufficiently pooled in the liquid pool portion, it is possible to supply lubricating oil to the pinion pins, the pinion gears, and the like. However, for example, when lubricating oil in the liquid pool portion runs dry or does not sufficiently fall because of high-viscosity lubricating oil, there is a possibility of insufficient lubrication of the pinion pins, the pinion gears, and the like. Because it is required to provide the above-described liquid pool portion, it is required to significantly modify an existing system, and there is a possibility that the size of the overall configuration of the hybrid system increases.

SUMMARY OF THE INVENTION

The invention provides a drive control system that is able to suppress a decrease in the durability of a planetary gear mechanism that constitutes a power split mechanism and also to execute a drive mode, in which a motor coupled to the power split mechanism is used as a driving force source for propelling a vehicle, for a long period of time as much as possible.

A drive control system related to the present invention is for a hybrid vehicle. The drive control system includes a power split mechanism, a brake mechanism, a first motor, an output member, a second motor and an electronic control unit. The power split mechanism includes a carrier, a sun gear and a ring gear as rotating elements. The power split mechanism is configured to carry out differential action. A torque output from an engine is transmitted to the carrier. The brake mechanism is configured to selectively stop rotation of the carrier. The first motor is coupled to one of the sun gear and the ring gear. The first motor is able to generate an electric power. The output member is coupled to the other one of the sun gear and the ring gear. The second motor is configured to add a driving torque for propelling the hybrid vehicle to a torque of the output member. The electronic control unit is configured to obtain a temperature of the power split mechanism based on a first time that is a duration of a motor driven state, allow the motor driven state when the obtained temperature obtained by the electronic control unit is lower than a predetermined upper limit temperature, and inhibit the motor driven state when the obtained temperature is higher than or equal to the upper limit temperature. The motor driven state is a state that satisfies following conditions i) to iii): i) rotation of the carrier is stopped by the brake mechanism; ii) a torque output from the first motor is transmitted to the output member via the power split mechanism; and iii) the second motor is outputting the driving torque.

When the carrier is fixed, lubrication of the power split mechanism is not always sufficient. When the driving torque is input from the first motor, friction in the power split mechanism increases. With the drive control system according to the invention, the motor driven state accompanied by a rise in temperature due to generation of heat does not continue beyond the upper limit temperature. Therefore, it is possible to prevent or suppress an excessive rise in the temperature of the pinion gears, pinion pins, and the like, supported by the carrier or a decrease in the durability thereof. The upper limit temperature may be set to a higher temperature as much as possible in advance in consideration of an influence on the durability of the pinion gears, the pinion pins, and the like. Therefore, it is possible to improve fuel economy by extending the time during which the hybrid vehicle travels by using the first motor and the second motor as the driving force sources.

The electronic control unit may be configured to, when the following conditions iv) and v) are satisfied, keep a determination that the motor driven state is established: iv)

the motor driven state is intermitted; and v) a second time that is a time during which the motor driven state is intermitted is shorter than a predetermined time.

With the above configuration, when the motor driven state is temporarily intermitted and the intermission time is shorter than a predetermined time, counting of the duration of the motor driven state is not intermitted but continued. This reduces a deviation in the correlation between the temperature of the power split mechanism, which is raised as a result of the motor driven state, and the count value of the duration. As a result, it is possible to prevent or suppress an excessive rise in the temperature of the pinion gears, pinion pins, and the like, which are supported by the carrier, or a decrease in the durability thereof.

The electronic control unit may be configured to obtain the temperature of the power split mechanism based on the first time and a rate of rise in the temperature. The electronic control unit may be configured to set the rate of rise in the temperature to a larger value as at least any one of the following values vi) to viii) increases: vi) a rotation speed of the first motor; vii) a torque that is input from the first motor to the power split mechanism; and viii) an energy that is input from the first motor to the power split mechanism.

With the above configuration, when it is estimated that a load on the power split mechanism is large, the rate of rise in the temperature of the power split mechanism is set to a larger value. That is, when the amount of heat generated per unit time in the power split mechanism is large, the duration of the motor driven state becomes short, and the amount of heat generated does not increase in total, so it is possible to prevent or suppress an excessive rise in the temperature of the pinion gears, pinion pins, and the like, which are supported by the carrier, or a decrease in the durability thereof.

The electronic control unit may be configured to detect a temperature of lubricating oil of the power split mechanism. The electronic control unit may be configured to obtain the temperature of the power split mechanism based on the first time and a rate of rise in the temperature. The electronic control unit may be configured to set the rate of rise in the temperature to a smaller value as the temperature of the lubricating oil decreases.

With the above configuration, when the temperature of the lubricating oil is low, the rate of rise in the temperature is set to a smaller value, so the duration of the motor driven state extends. As a result, an opportunity to travel by using the first motor and the second motor as the driving force sources increases or the travel time extends, with the result that it is possible to improve fuel economy.

The electronic control unit may be configured to obtain an initial temperature of the power split mechanism at the time of switching to the motor driven state. The electronic control unit may be configured to, when the initial temperature is lower than or equal to a predetermined reference temperature, obtain the temperature of the power split mechanism by adding a calculated temperature to the reference temperature. The calculated temperature may be a temperature obtained based on the first time and a rate of rise in the temperature. The electronic control unit may be configured to, when the initial temperature exceeds the predetermined reference temperature, obtain the temperature of the power split mechanism by adding the calculated temperature to the initial temperature.

With the above configuration, when the initial temperature of the power split mechanism at the time when the motor driven state is started is lower than the predetermined reference temperature, the temperature of the power split mechanism is obtained on the assumption that the temperature of the power split mechanism rises from the reference temperature. As a result, it is possible to avoid or suppress, for example, a situation that the temperature of the power split mechanism is determined as a temperature lower than an actual temperature.

The electronic control unit may be configured to acquire at least one of an operation state of the hybrid vehicle or environment information about an environment in which the hybrid vehicle is placed before switching to the motor driven state. The electronic control unit may be configured to obtain the initial temperature based on at least one of the operation state or the environment information.

The initial temperature is obtained on the basis of the operation state of the hybrid vehicle or the environment information before switching to the motor driven state. The temperature of the power split mechanism or the temperature of the pinion gears, pinion pins, and the like, supported by the carrier that constitutes the power split mechanism changes with the operation state of the hybrid vehicle or the environment in which the hybrid vehicle is placed. Therefore, it is possible to estimate the temperature of the pinion gears, pinion pins, and the like, from the operation state or the environment information, and the initial temperature is set on the basis of the operation state or the environment information. Specifically, in the operation state or environment in which the temperature of the pinion gears, pinion pins, and the like, rise, the initial temperature is set to a higher temperature; whereas, in the operation state or environment in which the temperature of the pinion gears, pinion pins, and the like, does not particularly rise, the initial temperature is set to a lower temperature. Therefore, it is possible to improve fuel economy by increasing the opportunity to travel by using the first motor and the second motor as the driving force sources in response to the operation state or environment of the hybrid vehicle, and it is possible to prevent or suppress an excessive rise in the temperature of the pinion gears, pinion pins, and the like, or a decrease in the durability.

The electronic control unit may be configured to, when the first time exceeds an upper limit time, inhibit the motor driven state. The upper limit time may be a predetermined time in which the motor driven state is allowed to be continued.

With the above configuration, when the duration of the motor driven state exceeds the predetermined upper limit time, the motor driven state is inhibited irrespective of the temperature of the above-described power split mechanism. Therefore, it is possible to prevent or suppress a decrease in the durability of the power split mechanism, or the like, on which a large load is exerted in the motor driven state.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 9:
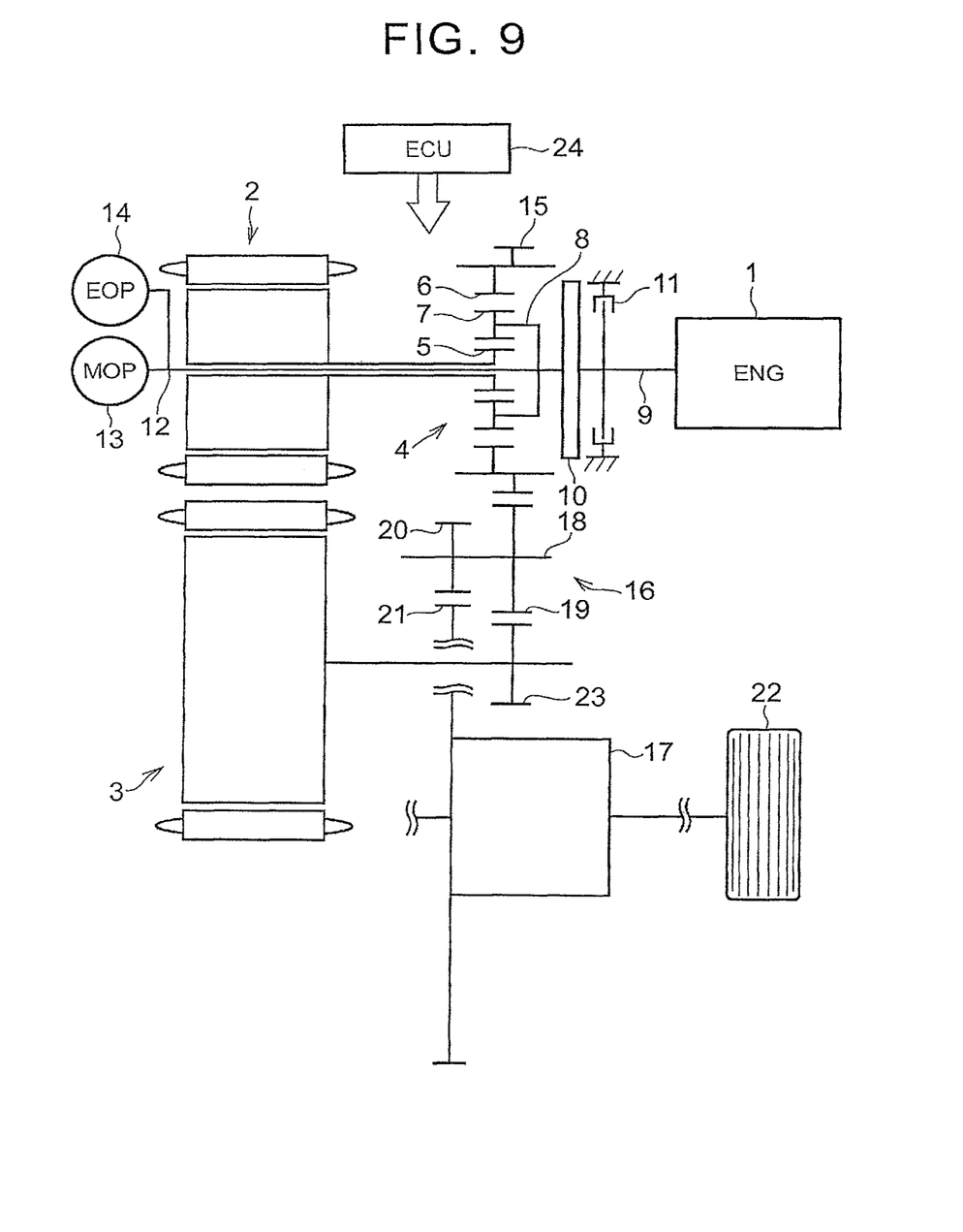
FIG. 9 is a skeletal view that shows an example of a drive line in a hybrid vehicle to which the invention is applicable.

FIG. 9 shows a skeletal view of a hybrid vehicle to which the invention is applicable. A hybrid drive system is a so-called two-motor drive system, and includes an engine (ENG) 1 and two motors 2, 3 as driving force sources. The engine 1 is an internal combustion engine, such as a gasoline engine and a diesel engine. The first motor 2 may be a motor generator (MG) that is able to regenerate energy and output power. In addition, the second motor 3 may be similarly a motor generator (MG). A power split mechanism 4 is provided. The power split mechanism 4 distributes power output from the engine 1 to the first motor 2 and an output member. The power split mechanism 4 may be formed of a differential mechanism, such as a planetary gear mechanism. In the example shown in FIG. 9, the power split mechanism 4 is formed of a single-pinion planetary gear mechanism.

A plurality of (for example, three) pinion gears 7 are arranged between a sun gear 5 and a ring gear 6. The plurality of pinion gears 7 are in mesh with these sun gear 5 and ring gear 6. Those pinion gears 7 are supported by a carrier 8 so as to be rotatable and revolvable. A structure of supporting the pinion gears 7 by the carrier 8 is similar to the structure in the generally known planetary gear mechanism. The structure will be simply described. Pinion pins are supported by the carrier 8. The pinion gears 7 are respectively fitted to the pinion pins via bearings, such as needle bearings, provided on the outer peripheral sides of the pinion pins. Each of the pinion pins has an oil hole along its central axis. Another oil hole extends from each oil hole to the outer periphery. Lubricating oil is supplied to the bearings and tooth flanks via these oil holes.

The carrier 8 is a so-called input element. Power from the engine 1 is transmitted to the carrier 8. That is, an output shaft (crankshaft) 9 of the engine 1 and the carrier 8 are coupled to each other via a damper mechanism 10. A brake mechanism 11 is provided between the carrier 8 and the engine 1. The brake mechanism 11 selectively stops rotation of the carrier 8. The brake mechanism 11 may be any one of a friction brake, a dog brake and a one-way clutch.

The first motor 2 is arranged along the same axis as the power split mechanism 4 across the power split mechanism 4 from the engine 1. The first motor 2 is coupled to the sun gear 5. Therefore, the sun gear 5 is a so-called reaction element. A rotor shaft of the first motor 2 and a sun gear shaft to which the rotor shaft is coupled are hollow shafts. A pump shaft 12 is inserted inside the hollow shafts. One end of the pump shaft 12 is coupled to the engine 1. An oil pump (mechanical oil pump (MOP)) 13 is coupled to the other end of the pump shaft 12. The MOP 13 is driven by the engine 1 to generate hydraulic pressure for control and hydraulic pressure for lubrication. Therefore, a second oil pump (electric oil pump (EOP)) 14 is provided in parallel with the MOP 13. The second oil pump 14 is driven by a motor in order to ensure hydraulic pressure at the time when the engine 1 is stopped.

The ring gear 6 in the planetary gear mechanism that constitutes the power split mechanism 4 is a so-called output element. An output gear 15 is integrally provided with the ring gear 6. The output gear 15 is an external gear corresponding to the output member in the embodiment of the invention. The output gear 15 is coupled to a differential gear 17 via a counter gear unit 16. That is, a driven gear 19 connected to a counter shaft 18 is in mesh with the output gear 15. A drive gear 20 having a smaller diameter than the driven gear 19 is connected to the counter shaft 18. The drive gear 20 is in mesh with the ring gear 21 in the differential gear 17. A driving force is output from the differential gear 17 to right and left drive wheels 22. Another drive gear 23 is in mesh with the driven gear 19. The second motor 3 is coupled to the drive gear 23. That is, torque of the second motor 3 is added to torque that is output from the output gear 15.

The first motor 2 and the second motor 3 are electrically connected to each other via an electrical storage device (not shown) or an inverter (not shown), and are configured to be able to supply electric power generated by the first motor 2 to the second motor 3.

The above-described hybrid vehicle is allowed to be selectively set to any one of three drive modes, that is, a hybrid mode (HV mode), a two-motor mode and a one-motor mode. The HV mode is a drive mode in which power output from the engine 1 is distributed by the power split mechanism 4 to the first motor 2 side and the output gear 15 side, electric power generated by the first motor 2 functioning as a power generator is supplied to the second motor 3, and the output torque of the second motor 3 is added to the torque of the output gear 15 in the counter gear unit 16. The two-motor mode is a mode in which the first motor 2 and the second motor 3 are operated as driving force sources for propelling the hybrid vehicle, and the hybrid vehicle travels by the use of the power of these two motors 2, 3. In this case, the carrier 8 is fixed by the brake mechanism 11. Therefore, the power split mechanism 4 functions as a speed reduction mechanism between the first motor 2 and the output gear 15. A state where the hybrid vehicle is traveling in the two-motor mode corresponds to a motor driven state according to the embodiment of the invention. The one-motor mode is a mode in which the hybrid vehicle travels by using the second motor 3 as a driving force source.

Figure 2:
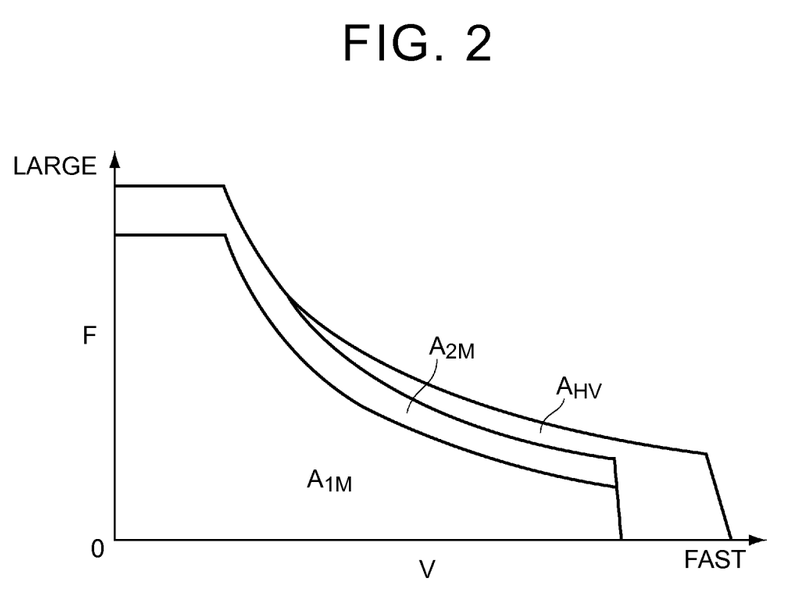
FIG. 2 is a map that shows an example of regions of an HV mode, a two-motor mode and a one-motor mode.

Driving torque, fuel economy, and the like, are different from one another among these drive modes, so regions of those drive modes are determined by a vehicle speed, a driving force, and the like, and the drive mode is selected on the basis of a required driving force, represented by an accelerator operation amount, and a vehicle speed. FIG. 2 shows the regions of the drive modes, determined in advance by a vehicle speed V and a driving force F. In FIG. 2, the region indicated by the sign AHV is the HV mode region, the region indicated by the sign A2M is the two-motor mode region, and the region indicated by the sign A1M is the one-motor mode region. An electronic control unit (ECU) 24 is provided as a controller for selecting any one of these drive modes and controlling the units of the hybrid drive system such that the selected drive mode is established. The ECU 24 is mainly formed of a microcomputer. The ECU 24 is configured to perform a computation on the basis of input data and data, such as a prestored map, and output the computed result as a control command signal to the engine 1, each of the motors 2, 3, the electrical storage device or the inverter for the motors 2, 3, the brake mechanism 11, or the like. Examples of data that are input to the ECU 24, that is, data that are used in control, include the vehicle speed, the accelerator operation amount, the rotation speeds of the motors 2, 3, the driving currents of the motors 2, 3, the temperature (oil temperature) of lubricating oil), the on/off state of an ignition switch of the hybrid vehicle, the open/closed state of a grill shutter provided at the front face of a vehicle body, the duration of the open state or closed state of the grill shutter, the temperature (ambient temperature) of an environment in which the hybrid vehicle is placed, and the like. The above-described regions shown in FIG. 2, the rate of rise and rate of decrease in the temperature of the pinion gears, pinion pins, or the like, the initial value of the temperature, determination thresholds for time and temperature, and the like, are stored in advance.

Figure 1:
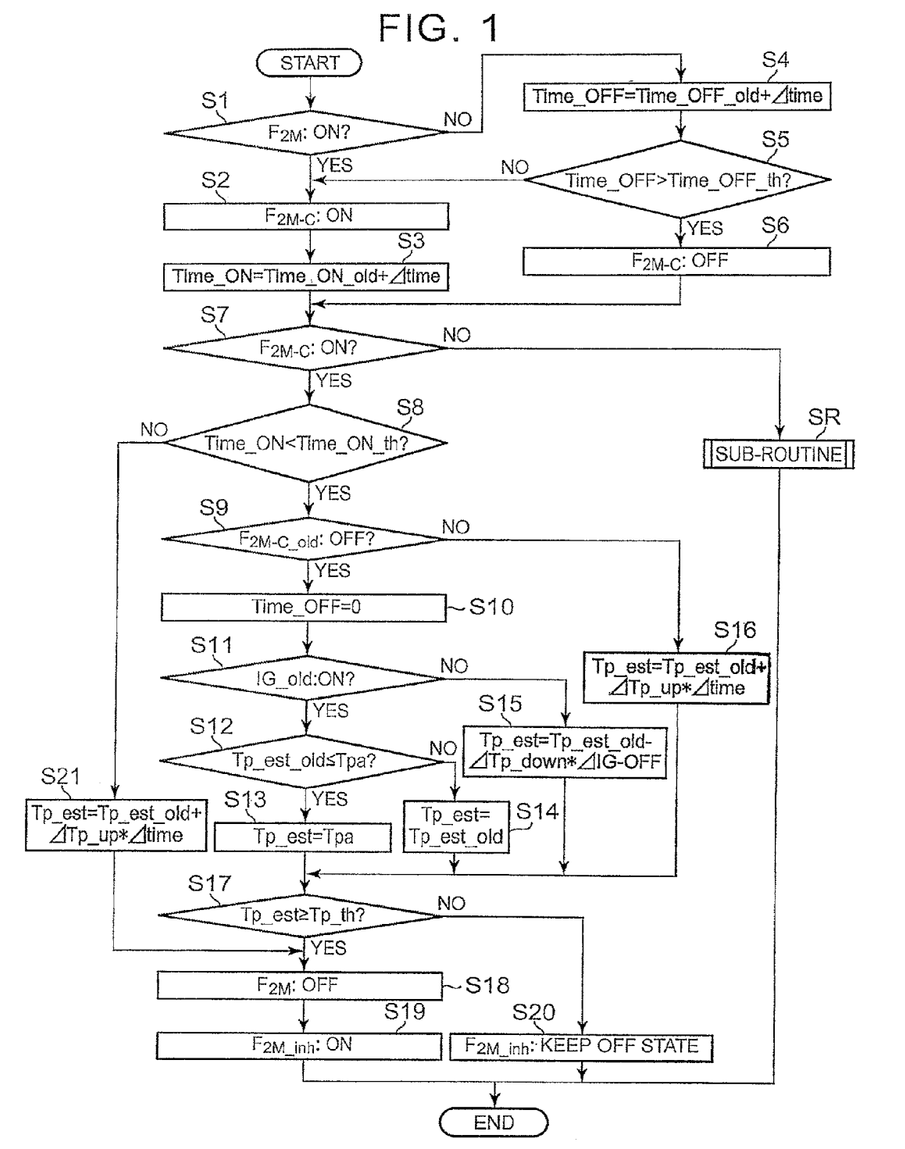
FIG. 1 is a flowchart for illustrating an example of control that is executed by a controller in a control system according to the invention.

The drive control system according to the invention is configured to execute the two-motor mode for a long period of time as much as possible within the range in which the temperature of the above-described pinion gears, pinion pins, and the like, does not excessively rise. The temperature of the power split mechanism is a temperature related to the power split mechanism, and includes the temperature of the pinion gears, pinion pins, and the like. An example of control for the above is shown by the flowchart in FIG. 1 The controller according to the embodiment of the invention is configured to execute this flowchart. The routine shown in FIG. 1 is repeatedly executed at predetermined short time intervals while the hybrid vehicle is traveling. In the control example shown in FIG. 1, initially, it is determined whether a flag (hereinafter, temporarily referred to as two-motor flag) F2M indicating that the above-described two-motor mode is set is in an on state (step S1). The two-motor mode is selected when the required driving force and the vehicle speed fall within the two-motor mode region A2M shown in FIG. 2, and the two-motor flag F2M is a flag that is set to the on state as a result of the selection.

When the flag F2M is in the on state as a result of the fact that the two-motor mode corresponding to the motor driven state according to the invention is selected, affirmative determination is made in step S1. In this case, the process proceeds to step S2, and a flag (hereinafter, temporarily referred to as continuation flag) F2M-C indicating that the two-motor mode is continuing is set to an on state. The continuation flag F2M-C is a flag for executing the process of determining whether a temporal intermission of the two-motor mode is treated as a continuation of the two-motor mode or treated as an end of the two-motor mode. After the continuation flag F2M-C is set to the on state, an on timer Time_ON is counted (step S3). Specifically, an execution time Δtime of one cycle of the routine shown in FIG. 1 is added to a value (last value) Time_ON_old of the on timer Time_ON in the case where the routine shown in FIG. 1 is executed last time. The last value Time_ON_old just after the continuation flag F2M-C switches to the on state is zero, and measuring of a time is started in this case.

On the other hand, when negative determination is made in step S1 as a result of the fact that the two-motor flag F2M is in an off state, an off timer Time_OFF is counted (step S4). The off timer Time_OFF is used to measure an elapsed time from when the two-motor mode ends and the two-motor flag F2M is set to the off state. Specifically, the execution time Δtime of one cycle of the routine shown in FIG. 1 is added to the value (last value) Time_OFF_old of the off timer Time_OFF in the case where the routine shown in FIG. 1 is executed last time. The last value Time_OFF_old just after the two-motor flag F2M switches to the off state is zero, and measuring of a time is started in this case.

It is determined whether the thus measured time (the value of the off timer Time_OFF) is larger than a predetermined threshold Time_OFF_th (step S5). This threshold Time_OFF_th is a value for determining whether an elapsed time after the drive mode switches from the two-motor mode to the drive mode other than the two-motor mode is a sufficient time to advance cooling of the above-described pinion gears 7, the pinion pins on which the pinion gears 7 are mounted, and the like. Therefore, this threshold Time_OFF_th may be determined in advance by design on the basis of an experiment, or the like, for each model of the hybrid vehicle or each model of the hybrid drive system. When negative determination is made in step S5 as a result of the fact that the elapsed time Time_OFF from when the two-motor flag F2M is set to the off state is shorter than or equal to the threshold Time_OFF_th, the process proceeds to the above-described step S2, and the continuation flag F2M-C is set to the on state. In contrast, when affirmative determination is made in step S5, the continuation flag F2M-C is set to the off state (step S6). That is, even when the two-motor mode ends, while the elapsed time after the end is shorter than the threshold Time_OFF_th, it is assumed that the two-motor mode is continued in terms of control. Therefore, in the control example shown in FIG. 1, a temporal intermission of the two-motor mode is not treated as an end of the two-motor mode.

After step S3 or step S6, it is determined whether the continuation flag F2M-C is in the on state (step S7). This determination is, in short, to determine whether it is in a state where the temperature of the pinion gears 7, the pinion pins, and the like, rises because of the fact that the carrier 8 is stopped and the first motor 2 is outputting torque. Therefore, when negative determination is made in step S7, the process proceeds to a sub-routine SR for executing control in process in which the temperature of the pinion gears 7, the pinion pins, and the like, decreases. In contrast, when affirmative determination is made in step S7, it is determined whether the count value of the on timer Time_ON is shorter than a threshold Time_ON_th for the duration of the two-motor mode (step S8). This threshold Time_ON_th is a time provided for the purpose of protecting the pinion gears 7, the pinion pins, and the like. In the two-motor mode, the carrier 8 is fixed and a large load or friction acts on the pinion gears 7, the pinion pins, and the like, so the threshold Time_ON_th is set by design as an upper limit time in which such an operation state is allowed to be continued.

Because the duration of the two-motor mode is short just after switching to the two-motor mode, affirmative determination is made in step S8. In this case, it is determined whether the continuation flag F2M-C_old at that time is in the off state (step S9). In other words, it is determined whether the continuation flag F2M-C has been set to the off state in the last execution cycle of the routine shown in FIG. 1. Because the continuation flag F2M-C is set to the on state in step S2 previous to step S9, when affirmative determination is made in step S9, it means that the drive mode has just switched to the two-motor mode. On the contrary, when negative determination is made in step S9, it means that the drive mode has already switched to the two-motor mode and the two-motor mode is continuing.

When affirmative determination is made in step S9 as a result of the fact that the drive mode has just switched to the two-motor mode, the count value of the off timer Time_OFF is reset to zero (step S10). It is determined whether the ignition switch (IG_old) of the hybrid vehicle at the time of last execution of the routine shown in FIG. 1 is in the on state (step S11). This step S11 is, in short, a step of determining whether the hybrid vehicle has been already started up. When affirmative determination is made in step S11 as a result of the fact that the hybrid vehicle has been already started up, it is determined whether a last value Tp_est_old of a temperature (hereinafter, referred to as pinion temperature) Tp_est of the pinion gears 7, the pinion pins, and the like, is lower than or equal to a predetermined reference temperature Tpa (step S12). By inputting a nominal value as the pinion temperature Tp_est at the time of factory shipment of the hybrid vehicle, it is possible to determine the last value Tp_est_old. The reference temperature Tpa is a temperature determined by design, and defines a lower limit value of the pinion temperature Tp_est at the time of the start of control. The pinion temperature Tp_est is an estimated temperature. When the estimated temperature is excessively lower than an actual temperature, there is a possibility that the pinion temperature Tp_est that rises in the two-motor mode is estimated as a lower temperature. The reference temperature Tpa is set in order to avoid or suppress estimation to such a lower temperature. Therefore, when affirmative determination is made in step S12 as a result of the fact that the last value Tp_est_old of the pinion temperature Tp_est is lower than or equal to the reference temperature Tpa, the reference temperature Tpa is employed as the pinion temperature Tp_est (step S13). In this case, as will be described later, the pinion temperature is obtained by adding the amount of rise in the temperature to the reference temperature. On the contrary, when negative determination is made in step S12 as a result of the fact that the last value Tp_est_old of the pinion temperature Tp_est exceeds the reference temperature Tpa, the last value Tp_est_old is employed as the pinion temperature Tp_est (step S14). In this case, as will be described later, the pinion temperature is obtained by adding the amount of rise in the temperature to the last value Tp_est_old.

When negative determination is made in step S11, an initial pinion temperature Tp_est (a temperature corresponding to an initial temperature according to the embodiment of the invention) to start the two-motor mode is calculated (step S15). When the ignition switch is in the off state, there is no factor that raises the pinion temperature Tp_est, and the pinion temperature Tp_est has a decreasing tendency, so the pinion temperature Tp_est is decreased with a lapse of time ΔIG-OFF on the assumption that the temperature decreases at a predetermined rate of decrease ΔTp_down. More specifically, because the pinion temperature Tp_est begins to decrease as a result of the fact that the ignition switch is set to the off state, the pinion temperature Tp_est at the time when the ignition switch has been set to the off state last time is stored as a last value (or a cooling start initial value Tp_est_old). During the time ΔIG_OFF in which the ignition switch is in the off state, the pinion temperature Tp_est decreases at the rate of decrease ΔTp_down commensurate with the situation at that time. Therefore, the initial temperature Tp_est at the time when the two-motor mode begins as a result of the fact that the ignition switch is set to the on state is calculated by adding a decrease temperature, obtained from the above-described time ΔIG_OFF and rate of decrease ΔTp_down, to the stored last value Tp_est_old.

On the other hand, when negative determination is made in step S9, that is, when the continuation flag F2M-C is already in the on state, because the pinion temperature Tp_est has a rising tendency, the pinion temperature Tp_est is raised with a lapse of time Δtime on the assumption that the pinion temperature Tp_est rises at a predetermined rate of rise ΔTp_up (step S16). That is, the product of the rate of rise ΔTp_up and the time Δtime is added to the last value Tp_est_old. The time Δtime is the execution time of one cycle of the routine shown in FIG. 1.

Figure 3:
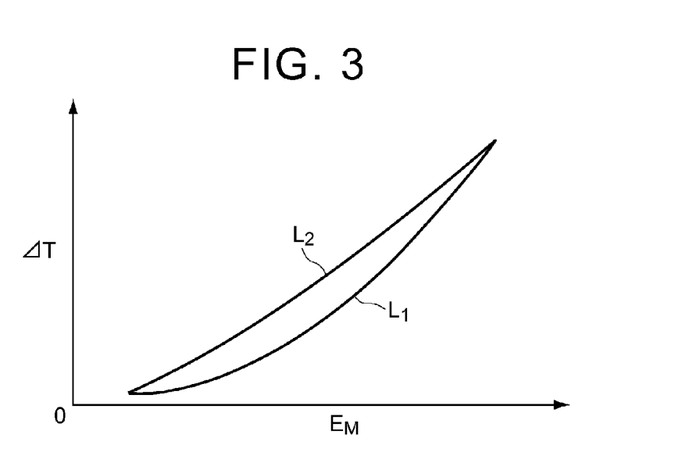
FIG. 3 is a graph that schematically shows measured results of the correlation between a power that a first motor outputs or an energy amount that is input to a power split mechanism and a rate of change in pinion temperature.

The above-described rate of decrease ΔTp_down and rate or rise ΔTp_up will be described. In the two-motor mode corresponding to the motor driven state according to the embodiment of the invention, power output from the first motor 2 is input to the power split mechanism 4, and heat is generated commensurately with the input power. The inventors measured the correlation between the power output from the first motor 2 in the two-motor mode and a variation per unit time (rate of change in temperature) in the temperature of the pinion gears 7, the pinion pins, and the like (hereinafter, temporarily referred to as pinion temperature). FIG. 3 schematically shows the measured results. In FIG. 3, the line L1 indicates measured values in the case where the temperature of lubricating oil is set so as to be lower than that in the example indicated by the line L2. It is found from the measured results shown in FIG. 3 that a rate of change (rate of rise) ΔT in pinion temperature increases as the output energy of the first motor 2 or an energy EM that is input to the power split mechanism 4 increases. This is presumably because the amount of energy that is converted to heat is large. It is also found that as the temperature of lubricating oil that is supplied to the power split mechanism 4 decreases, the rate of change (rate of rise) ΔT in pinion temperature decreases. This is conceivably because, as the difference between the pinion temperature and the oil temperature increases, heat radiated from the pinion gears 7, and the like, is more facilitated.

Figure 4:
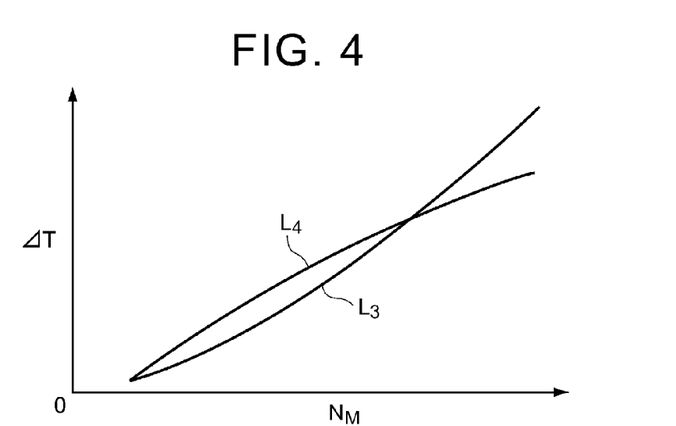
FIG. 4 is a graph that schematically shows measured results of the correlation between a rotation speed of the first motor and a rate of change in pinion temperature.

The inventors measured the correlation between the rotation speed NM of the first motor 2 and the rate of change ΔT in pinion temperature in the two-motor mode. FIG. 4 schematically shows the measured results. In FIG. 4, the line L3 indicates measured values in the case where the temperature of lubricating oil is set so as to be lower than that in the example indicated by the line L4. It is found from the measured results shown in FIG. 4 that the rate of change (rate of rise) ΔT in pinion temperature increases as the rotation speed NM of the first motor 2 increases, and the rate of change (rate of rise) ΔT in pinion temperature reduces as the temperature of lubricating oil that is supplied to the power split mechanism 4 decreases. It is also found that the effect of suppressing the rate of change ΔT due to a low lubricating oil temperature decreases with an increase in rotation speed. When the correlation between the rotation speed NM of the first motor 2 and the rate of rise ΔT in pinion temperature is studied, as the rotation speed NM increases, the amount of heat generated due to energy loss increases, and the amount of lubricating oil dipped increases and, as a result, cooling action by lubricating oil increases. In the measuring experiment performed by the inventors, it is understood that, because of an experiment condition in which an increase in the latter cooling action is inferior to an increase in the former amount of heat generated, the rate of rise ΔT in pinion temperature increases as the rotation speed NM increases. Therefore, when the configuration is set such that a larger amount of lubricating oil can be dipped as the rotation speed NM increases, it is presumable that it is possible to decrease the rate of rise ΔT in pinion temperature as the rotation speed NM increases. That is, because cooling action by lubricating oil increases as the amount of lubricating oil dipped increases, the rate of rise in pinion temperature is suppressed in the two-motor mode, and the rate of decrease in pinion temperature increases in the drive mode other than the two-motor mode.

Figure 5:
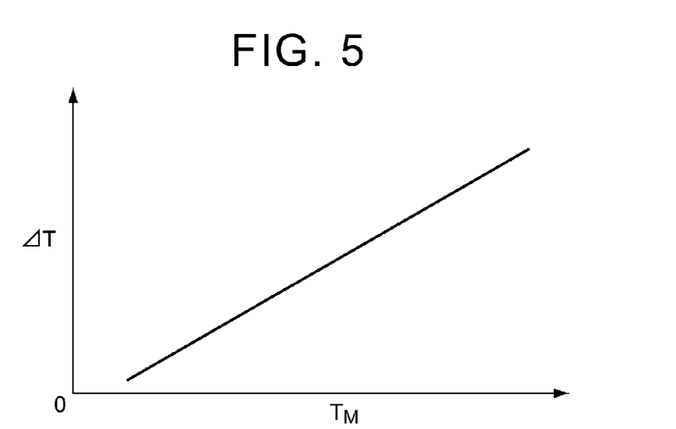
FIG. 5 is a graph that schematically shows measured results of the correlation between a torque of the first motor and a rate of change in pinion temperature.

The inventors further measured the correlation between the torque TM of the first motor 2 and the rate of change $\Delta T$ in pinion temperature in the two-motor mode. FIG. 5 schematically shows the measured results. It is found from the measured results shown in FIG. 5 that the rate of change (rate of rise) $\Delta T$ in pinion temperature increases as the torque TM of the first motor 2 increases.

Figure 6:
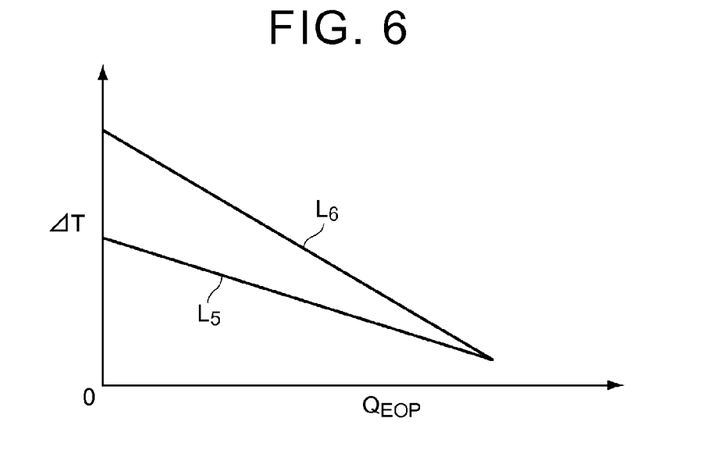
FIG. 6 is a graph that schematically shows measured results of the correlation between a discharge oil amount of an EOP and a rate of change in pinion temperature.

The inventors further measured the rate of change $\Delta T$ in pinion temperature while changing the discharge oil amount QEOP of the EOP 14 in the two-motor mode. FIG. 6 schematically shows the results. The measured results in the case of a low vehicle speed at a high torque are indicated by the line L5, and the measured results in the case of a high vehicle speed at a low torque are indicated by the line L6. In any cases, the pinion temperature decreased with an increase in the discharge oil amount of the EOP 14, and the pinion temperature significantly decreased with an increase in the vehicle speed or with an increase in the rotation speed of the first motor 2. It is found from the measured results that, when the discharge oil amount of the EOP 14 is increased, the rate of rise $\Delta Tp\_up$ in pinion temperature in the two-motor mode is suppressed, and the rate of decrease $\Delta Tp\_down$ in pinion temperature in the drive mode other than the two-motor mode is increased.

Figure 7:
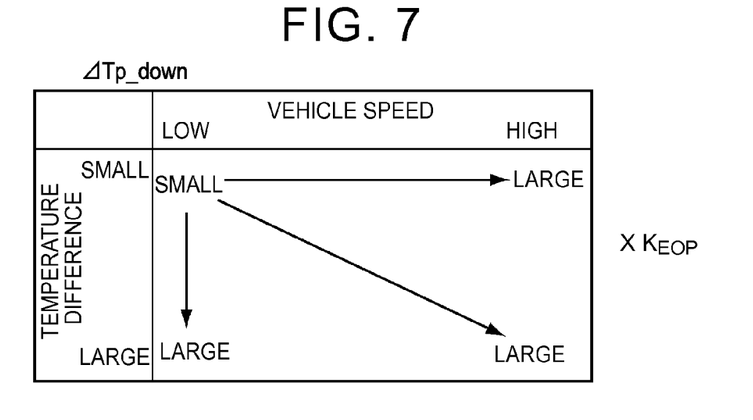
FIG. 7 is a view that shows an example of a map of a rate of decrease, which is used in the control.

From these measured results shown in FIG. 3 to FIG. 6, it may be determined that the rate of change (rate of decrease) $\Delta Tp\_down$ in pinion temperature increases as heat radiated from the pinion gears 7, and the like, is facilitated like, for example, the amount of lubricating oil dipped increases or the temperature of lubricating oil decreases. It is presumable that heat radiation from the pinion gears 7, and the like, mainly occurs as a result of removal of heat from the pinion gears 7, and the like, by lubricating oil, so the factors of heat radiation (heat radiation factors) are a temperature difference between the pinion temperature Tp_est and the oil temperature, the vehicle speed related to the amount of oil dipped by the pinion gears 7, and the like, the discharge oil amount of the EOP 14, and the like. That is, as the temperature difference increases, the rate of decrease $\Delta Tp\_down$ increases, and, as the vehicle speed increases, the amount of oil increases and the rate of decrease $\Delta Tp\_down$ increases. When the EOP 14 is operating, the discharge oil amount increases and the rate of decrease $\Delta Tp\_down$ increases. Therefore, the rate of decrease $\Delta Tp\_down$ may be prepared as a map that uses these heat radiation factors as parameters, and an example of the map is shown in FIG. 7. In the example shown in FIG. 7, the value related to the EOP 14 is a correction coefficient KEOP. The correction coefficient KEOP is set such that the rate of decrease $\Delta Tp\_down$ in the case where the discharge oil amount of the EOP 14 is large is larger than the rate of decrease $\Delta Tp\_down$ in the case where the discharge oil amount of the EOP 14 is small. FIG. 7 shows the correlation between the temperature difference or vehicle speed and the rate of decrease $\Delta Tp\_down$. The value of an actual rate of change $\Delta Tp\_down$ is influenced by the performance of an oil cooler (not shown) in an actual machine, the shape of a rotating member, such as a gear, that dips lubricating oil, whether there is a protrusion in a route through which lubricating oil reaches the pinion gears 7, and the like, the number of the protrusions, and the like, so the rate of decrease $\Delta Tp\_down$ is obtained in advance by an experiment, or the like, on an actual machine. In addition, the above-described time $\Delta IG\text{-}OFF$ should be measured by a predetermined timer.

Figure 8:
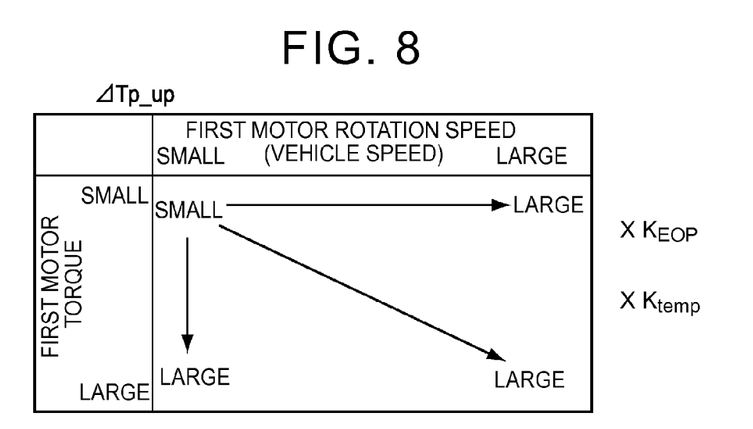
FIG. 8 is a view that shows an example of a map of a rate of increase, which is used in the control.

On the other hand, the rate of rise $\Delta Tp\_up$ in pinion temperature will be described. From the above-described measured results, it may be understood that the pinion temperature Tp_est changes with a difference between the amount of heat generated due to energy loss and the amount of heat removed by mainly lubricating oil. Factors of the heat generation (heat generation factors) are an energy that is input to the power split mechanism 4, the torque or rotation speed of the first motor 2, and the like. In contrast, factors of heat radiation (heat radiation factors) are the above-described temperature difference between the pinion temperature Tp_est and the oil temperature (or the oil temperature), the vehicle speed (or the rotation speed of the first motor 2) related to the amount of oil dipped by the pinion gears 7, and the like, the discharge oil amount of the EOP 14, and the like. Among these factors, it is presumable that the influence due to the energy that is input to the power split mechanism 4 is the largest, so the rate of rise $\Delta Tp\_up$ increases as the amount of energy (that is, the torque and rotation speed of the first motor 2) increases. Therefore, the rate of rise $\Delta Tp\_up$ may be prepared as a map that uses these heat generation factors and heat radiation factors as parameters, and an example of the map is shown in FIG. 8. As shown in FIG. 8, the rate of rise $\Delta Tp\_up$ is set so as to be a larger value as the torque of the first motor 2 increases or as the rotation speed of the first motor 2 increases. As the rotation speed of the first motor 2 (that is, the vehicle speed) increases, the amount of lubricating oil dipped increases and, as a result, the amount of heat radiation increases, so the influence of an increase in the rotation speed of the first motor 2 to increase the rate of rise $\Delta Tp\_up$ is smaller than the influence of an increase in the torque of the first motor 2.

In the example shown in FIG. 8, a reference value is obtained on the basis of the torque and rotation speed of the first motor 2, and the rate of rise $\Delta Tp\_up$ is obtained by correcting the reference value with the correction coefficient KEOP related to the EOP 14 and a correction coefficient Ktemp related to the oil temperature. The correction coefficient Ktemp related to the oil temperature is set such that the rate of rise $\Delta Tp\_up$ decreases as the oil temperature decreases. FIG. 8 shows the correlation between the torque or rotation speed of the first motor 2 and the rate of rise $\Delta Tp\_up$. The value of an actual rate of rise $\Delta Tp\_up$, as in the case of the example of the above-described rate of decrease $\Delta Tp\_down$, is significantly influenced by the structure of the hybrid drive system, so the rate of rise $\Delta Tp\_up$ is obtained in advance by an experiment, or the like, on an actual machine.

After the pinion temperature Tp_est (estimated value) is obtained in any one of steps S13 to S16, it is determined whether the pinion temperature Tp_est is higher than or equal to an upper limit temperature Tp_th (step S17). The upper limit temperature Tp_th is a temperature determined by design in consideration of the durability, and the like, of the pinion gears 7, the pinion pins, the bearings of the pinion pins and lubricating oil. When affirmative determination is made in step S17 as a result of the fact that the pinion temperature Tp_est is higher than or equal to the upper limit temperature Tp_th, the two-motor flag F2M is set to the off state (step S18), and the two-motor mode corresponding to the motor driven state according to the embodiment of the invention is ended. In this case, the HV mode or the one-motor mode is set in response to the vehicle speed, the accelerator operation amount, and the like. An inhibition flag F2M_inh that inhibits the two-motor mode is set to the on state (step S19), and then the routine shown in FIG. 1 is once ended. That is, the two-motor mode is inhibited. In contrast, when negative determination is made in step S17 as a result of the fact that the pinion temperature Tp_est is lower than the upper limit temperature Tp_th, the inhibition flag F2M_inh is kept in the off state (step S20), and then the routine shown in FIG. 1 is once ended. That is, the two-motor mode is allowed, and, when the two-motor mode is already set, the two-motor mode is continued. In this case, because it is estimated that the temperature of the pinion gears 7, the pinion pins, and the like, is still low, a decrease in the durability of the pinion gears 7, the pinion pins, and the like, is avoided or suppressed.

When negative determination is made in step S8 as a result of the fact that the above-described on timer Time_ON that is counted in step S3 becomes longer than or equal to the threshold Time_ON_th for the duration of the two-motor mode, the pinion temperature Tp_est is updated on the basis of the above-described rate of rise ΔTp_up and time Δtime (step S21), and then the process proceeds to step S18. That is, the two-motor mode is ended, and the two-motor mode is inhibited.

In the above-described specific example, the initial temperature at the time when the two-motor mode is switched is obtained by adding a decrease temperature, obtained from the rate of decrease ΔTp_down in pinion temperature and the time ΔIG_OFF during which the ignition switch is in the off state, to the pinion temperature Tp_est_old at the time when the ignition switch has been set to the off state last time (step S15). The invention is not limited to the above-described specific example. The initial temperature may be obtained on the basis of an operation state of the hybrid vehicle, environment information about an environment in which the hybrid vehicle is placed, or the like, before switching to the two-motor mode. Examples of data related to the operation state include an elapsed time from when the ignition switch is set to the on state, a time from when the ignition switching is set to the off state to when the ignition switch is set to the on state, the temperature of lubricating oil, an integrated value of energy input to the pinion gears 7 or the power split mechanism 4, the drive mode, that is, the one-motor mode or the HV mode, the open/closed state of the shutter provided at the front grill of the hybrid vehicle, and the like. Examples of the environment information include the temperature (ambient temperature) of an environment in which the hybrid vehicle is placed, the amount of air flowing into an engine compartment of the hybrid vehicle, and the like. These traveling state and environment act to decrease the pinion temperature; however, the rate of decrease depends on each piece of data, so the rate of decrease corresponding to each piece of data is obtained in advance by analysis that uses an actual machine.

In the above-described specific example, the example in which the power split mechanism is formed of the single-pinion planetary gear mechanism is described. Instead, the invention is applicable to an example in which the power split mechanism is formed of a double-pinion planetary gear mechanism. The hybrid vehicle to which the invention is applicable just needs to be, in short, configured to cause the power split mechanism to function as a speed reducer for the first motor by fixing the carrier of the power split mechanism.

What is claimed is:
1. A drive control system for a hybrid vehicle, the drive control system comprising:
a power split mechanism including a carrier, a sun gear and a ring gear as rotating elements, the power split mechanism being configured to carry out differential action, a torque output from an engine being transmitted to the carrier;
a brake mechanism configured to selectively stop rotation of the carrier;
a first motor coupled to one of the sun gear and the ring gear, the first motor being able to generate an electric power;
an output member coupled to the other one of the sun gear and the ring gear;
a second motor configured to add a driving torque for propelling the hybrid vehicle to a torque of the output member; and
an electronic control unit configured to obtain a temperature of the power split mechanism based on a first time that is a duration of a motor driven state, allow the motor driven state when the obtained temperature obtained by the electronic control unit is lower than a predetermined upper limit temperature, and inhibit the motor driven state when the obtained temperature is higher than or equal to the upper limit temperature, the motor driven state being a state that satisfies following conditions i) to iii),
i) rotation of the carrier is stopped by the brake mechanism,
ii) a torque output from the first motor is transmitted to the output member via the power split mechanism, and
iii) the second motor is outputting the driving torque, wherein the electronic control unit is configured to obtain the temperature of the power split mechanism based on the first time and a rate of rise in the temperature, and the electronic control unit is configured to set the rate of rise in the temperature to a larger value as at least any one of the following values vi) to viii) increases,
vi) a rotation speed of the first motor,
vii) a torque that is input from the first motor to the power split mechanism, and
viii) an energy that is input from the first motor to the power split mechanism.
2. The drive control system according to claim 1, wherein the electronic control unit is configured to, when the following conditions iv) and v) are satisfied, keep a determination that the motor driven state is established,
iv) the motor driven state is intermitted, and
v) a second time that is a time during which the motor driven state is intermitted is shorter than a predetermined time.
3. The drive control system according to claim 1, wherein the electronic control unit is configured to, when the first time exceeds an upper limit time, inhibit the motor driven state, and
the upper limit time is a predetermined time in which the motor driven state is allowed to be continued.
4. A drive control system for a hybrid vehicle, the drive control system comprising:
a power split mechanism including a carrier, a sun gear and a ring gear as rotating elements, the power split mechanism being configured to carry out differential action, a torque output from an engine being transmitted to the carrier;
a brake mechanism configured to selectively stop rotation of the carrier;
a first motor coupled to one of the sun gear and the ring gear, the first motor being able to generate an electric power;

an output member coupled to the other one of the sun gear and the ring gear;

a second motor configured to add a driving torque for propelling the hybrid vehicle to a torque of the output member; and an electronic control unit configured to obtain a temperature of the power split mechanism based on a first time that is a duration of a motor driven state, allow the motor driven state when the obtained temperature obtained by the electronic control unit is lower than a predetermined upper limit temperature, and inhibit the motor driven state when the obtained temperature is higher than or equal to the upper limit temperature, the motor driven state being a state that satisfies following conditions i) to iii), i) rotation of the carrier is stopped by the brake mechanism, ii) a torque output from the first motor is transmitted to the output member via the power split mechanism, and iii) the second motor is outputting the driving torque, wherein the electronic control unit is configured to detect a temperature of lubricating oil of the power split mechanism, the electronic control unit is configured to obtain the temperature of the power split mechanism based on the first time and a rate of rise in the temperature, and the electronic control unit is configured to set the rate of rise in the temperature to a smaller value as the temperature of the lubricating oil decreases.

5. The drive control system according to claim 4, wherein the electronic control unit is configured to, when the following conditions iv) and v) are satisfied, keep a determination that the motor driven state is established, iv) the motor driven state is intermitted, and v) a second time that is a time during which the motor driven state is intermitted is shorter than a predetermined time.

6. The drive control system according to claim 4, wherein the electronic control unit is configured to, when the first time exceeds an upper limit time, inhibit the motor driven state, and the upper limit time is a predetermined time in which the motor driven state is allowed to be continued.

7. A drive control system for a hybrid vehicle, the drive control system comprising:

a power split mechanism including a carrier, a sun gear and a ring gear as rotating elements, the power split mechanism being configured to carry out differential action, a torque output from an engine being transmitted to the carrier;

a brake mechanism configured to selectively stop rotation of the carrier;

a first motor coupled to one of the sun gear and the ring gear, the first motor being able to generate an electric power;

an output member coupled to the other one of the sun gear and the ring gear;

a second motor configured to add a driving torque for propelling the hybrid vehicle to a torque of the output member; and an electronic control unit configured to obtain a temperature of the power split mechanism based on a first time that is a duration of a motor driven state, allow the motor driven state when the obtained temperature obtained by the electronic control unit is lower than a predetermined upper limit temperature, and inhibit the motor driven state when the obtained temperature is higher than or equal to the upper limit temperature, the motor driven state being a state that satisfies following conditions i) to iii), i) rotation of the carrier is stopped by the brake mechanism, ii) a torque output from the first motor is transmitted to the output member via the power split mechanism, and iii) the second motor is outputting the driving torque, wherein the electronic control unit is configured to obtain an initial temperature of the power split mechanism at the time of switching to the motor driven state, the electronic control unit is configured to, when the initial temperature is lower than or equal to a predetermined reference temperature, obtain the temperature of the power split mechanism by adding a calculated temperature to the reference temperature, the calculated temperature is a temperature obtained based on the first time and a rate of rise in the temperature, and the electronic control unit is configured to, when the initial temperature exceeds the predetermined reference temperature, obtain the temperature of the power split mechanism by adding the calculated temperature to the initial temperature.

8. The drive control system according to claim 7, wherein the electronic control unit is configured to acquire at least one of an operation state of the hybrid vehicle or environment information about an environment in which the hybrid vehicle is placed before switching to the motor driven state, and the electronic control unit is configured to obtain the initial temperature based on at least one of the operation state or the environment information.

9. The drive control system according to claim 7, wherein the electronic control unit is configured to, when the following conditions iv) and v) are satisfied, keep a determination that the motor driven state is established, iv) the motor driven state is intermitted, and v) a second time that is a time during which the motor driven state is intermitted is shorter than a predetermined time.

10. The drive control system according to claim 7, wherein the electronic control unit is configured to, when the first time exceeds an upper limit time, inhibit the motor driven state, and the upper limit time is a predetermined time in which the motor driven state is allowed to be continued.

* * * * *